United States Patent
Schumann et al.

(10) Patent No.: US 11,391,827 B2
(45) Date of Patent: Jul. 19, 2022

(54) METHOD FOR THE IMPROVED DETECTION OF A GROUND ECHO SIGNAL IN AN ULTRASONIC SENSOR OF A VEHICLE

(71) Applicant: Robert Bosch GmbH, Stuttgart (DE)

(72) Inventors: Michael Schumann, Stuttgart (DE); Simon Weissenmayer, Flein (DE); Timo Koenig, Unterheinriet (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 16/959,792

(22) PCT Filed: Apr. 4, 2019

(86) PCT No.: PCT/EP2019/058484
§ 371 (c)(1),
(2) Date: Jul. 2, 2020

(87) PCT Pub. No.: WO2019/193087
PCT Pub. Date: Oct. 10, 2019

(65) Prior Publication Data
US 2020/0341129 A1    Oct. 29, 2020

(30) Foreign Application Priority Data
Apr. 4, 2018   (DE) .......................... 102018204996.3

(51) Int. Cl.
*G01S 7/52*    (2006.01)
*G01S 7/536*   (2006.01)
(Continued)

(52) U.S. Cl.
CPC .......... *G01S 7/52004* (2013.01); *G01S 7/536* (2013.01); *G01S 7/539* (2013.01); *G01S 15/60* (2013.01);
(Continued)

(58) Field of Classification Search
CPC ........ G01S 15/60; G01S 15/931; G01S 15/88; G01S 7/539; G01S 7/52004; G01S 7/536;
(Continued)

(56) References Cited

U.S. PATENT DOCUMENTS 10,207,718 B2 *   2/2019   Gordon ................ H04B 1/3822
10,259,452 B2 *   4/2019   Gordon ................ B60W 30/085
(Continued)

FOREIGN PATENT DOCUMENTS

DE    102006032542 A1    1/2008
DE    102011085287 A1    5/2013
(Continued)

OTHER PUBLICATIONS

International Search Report for PCT/EP2019/058484, dated Jul. 22, 2019.

*Primary Examiner* — Isam A Alsomiri
*Assistant Examiner* — Amie M Ndure
(74) *Attorney, Agent, or Firm* — Norton Rose Fulbright US LLP; Gerard Messina

(57) ABSTRACT

A method for detecting a ground echo signal of an ultrasonic sensor of a vehicle. The ultrasonic sensor emits a signal at a first frequency or having a first frequency profile, the signal is reflected by a roadway surface and the reflected signal is received by the ultrasonic sensor and/or by an additional ultrasonic sensor. The received echo signal is filtered with the aid of a matched filter, the matched filter being adapted to the emitted signal and having a characterizing frequency. In this way a ground echo signal is determined from the filtered signal. The instantaneous vehicle speed is determined and an expected Doppler shift of the reflected signal is determined as a function of the instantaneous vehicle speed. The first frequency or the first frequency profile and/or the characterizing frequency of the
(Continued)

matched filter is/are adapted as a function of the Doppler shift to be expected.

11 Claims, 3 Drawing Sheets

(51) Int. Cl.
    *G01S 7/539*      (2006.01)
    *G01S 15/60*      (2006.01)
    *G01S 15/931*      (2020.01)

(52) U.S. Cl.
    CPC ... *G01S 15/931* (2013.01); *G01S 2007/52012* (2013.01); *G01S 2015/938* (2013.01)

(58) Field of Classification Search
    CPC . G01S 2007/52009; G01S 2007/52012; G01S 2015/938
    See application file for complete search history.

(56) References Cited

U.S. PATENT DOCUMENTS

2018/0265054 A1*   9/2018   Hofmann ................ B60T 8/172
2019/0327124 A1*   10/2019   Lai ........................ H04L 27/362

FOREIGN PATENT DOCUMENTS

| | | |
|---|---|---|
| DE | 102012216290 A1 | 3/2014 |
| DE | 102015209878 B3 | 2/2016 |
| DE | 102015205180 A1 | 9/2016 |
| DE | 102015106403 A1 | 10/2016 |
| JP | 01314987 A * | 12/1989 |
| JP | H01314987 A | 12/1989 |
| JP | H0580152 A | 4/1993 |

* cited by examiner

METHOD FOR THE IMPROVED DETECTION OF A GROUND ECHO SIGNAL IN AN ULTRASONIC SENSOR OF A VEHICLE

FIELD

The present invention relates to a method for detecting a ground echo signal of an ultrasonic sensor of a vehicle as well as to a method for determining a functional efficiency of an ultrasonic sensor of a vehicle and for detecting a road condition in the surroundings of a vehicle, in which a ground echo signal is used.

BACKGROUND INFORMATION

It is conventional to identify a potential blindness of ultrasonic sensors at a vehicle, which are used, for example, for distance measurements for parking assistance functions, with the aid of an assessment of the received echo signals of the ground (so-called ground clutter). In the process, the sensor transmits an ultrasonic signal and detects the echo signals of the roadway. This is described, for example, in German Patent Application No. DE 10 2015 205 180 A1. On the basis of the ground echo signals thus detected, it is possible to calculate a so-called clutter value, which correlates with the average value of the backscatter amplitudes in a particular time interval. At higher speeds (for example, >40 km/h), the signal strength of the received ground echo signals decreases sharply due to the Doppler shift of the ground echo and it is no longer possible to reliably use the ground echo signal for a blindness assessment, since the dynamics of the signal are no longer sufficient.

To detect the road condition with respect to the degree of wetness and danger of aquaplaning, it is provided in the related art to use a ground echo signal, for example, as described in German Patent Application No. DE 10 2011 085 287 A1. Alternatively or in addition, the acoustic noise caused by tire noise may be detected and assessed in order to be able to draw conclusions about the road condition. The quality or strength of the useful signal available in this case for the assessment increases with the vehicle speed. At low speeds (approximately <50 km/h), a distinction between a dry roadway and a wet roadway is not robustly possible.

The emission of the ultrasonic signals in the case of ultrasonic sensors at a vehicle, which are used, for example, for distance measurements for parking assistance functions, is normally frequency-modulated. The received signals are decoded via matched filtering (also referred to as optimal filtering). The received signal is Doppler-shifted as a result of the vehicle movement, i.e., the complete frequency band of the frequency-modulated emitted signal and thus also the center frequency is shifted by the Doppler fraction $\Delta f$ to lower frequencies if the driving direction is directed straight ahead and the ultrasonic sensor is situated at the rear end of the vehicle, or shifted by $\Delta f$ to higher frequencies if the driving direction is straight ahead and the ultrasonic sensor is situated at the front end of the vehicle.

The result of the Doppler shift is, on the one hand, an attenuation of the received signal by the matched filter, which is no longer optimally adapted to the signal, and, on the other hand, an attenuation of the received signal as a result of the loss of sensitivity in the event the Doppler-shifted signal is received in a frequency range with a lower sensitivity of the ultrasonic sensor.

The losses caused by the Doppler shift become dominant above a speed of approximately 40 km/h, the function identification (blindness function) is then no longer available. Even for an evaluation of the ground echo signal with respect to the road condition, the ground echo signal then exhibits too little signal dynamics with respect to different surface conditions, for example, dry or wet.

SUMMARY

An object of the present invention is to provide a method for detecting a ground echo signal of an ultrasonic sensor of a vehicle. The ground echo signal detected according to the present invention exhibits improved dynamics as compared to the related art and may therefore be used both for an improved identification of a road condition in the surroundings of the vehicle as well as an improved blindness detection of the ultrasonic sensor.

According to an example embodiment of the present invention, a method is provided for detecting a ground echo signal of an ultrasonic sensor of a vehicle. The ultrasonic sensor emits a signal at a first frequency or with a first frequency profile, the signal is reflected by a roadway surface and the reflected signal is received by the ultrasonic sensor and/or by an additional ultrasonic sensor of the vehicle. The received echo signal is filtered with the aid of a matched filter, the matched filter being adapted to the emitted signal and exhibiting a characterizing frequency. In this way, a ground echo signal is determined based on the filtered signal. According to the present invention, the instantaneous vehicle speed is determined and an expected Doppler shift of the reflected signal is determined as a function of the instantaneous vehicle speed. The first frequency or the first frequency profile and/or the characterizing frequency of the matched filter is/are adapted as a function of the expected Doppler shift.

The ground echo signal thus determined has a high signal quality, in particular, high dynamics and may thus be advantageously further used for determining a functional efficiency of an ultrasonic sensor (blindness identification) and/or for identifying a road condition in the surroundings of the vehicle, even at speeds of, for example, greater than 40 km/h.

A clutter value which characterizes, for example, the reflectivity of the roadway surface, may, in particular, be determined from the ground echo signal.

In one preferred embodiment of the present invention, it is provided that a center frequency of the first frequency profile and/or the characterizing frequency of the matched filter is/are shifted by a particular value.

The present invention is based on the finding that since the vehicle movement and, in particular, the vehicle speed are known, the attenuations of the ground echo signal caused by the Doppler effect may be largely compensated for. The attenuation by the unadapted matched filter may be completely compensated for if either the frequencies of the emitted signals are shifted by a value $\Delta f$ corresponding to the Doppler shift or the matched filter is adapted by $\Delta f$, i.e., for example, at least one frequency characterizing the matched filter is shifted by a value $\Delta f$ corresponding to the Doppler effect. Depending on the transmission behavior of the ultrasonic sensor, it may be more advantageous to shift the frequencies of the emitted signals in order to prevent the reflected signals from being received outside the sensitivity range of the converter. At very high speeds, in particular, it may also be expedient to shift the emitted signals by, for example, $+/-\Delta f/2$ and to simultaneously shift the matched filter by $+/-\Delta f/2$.

The detection of a ground echo signal of an ultrasonic sensor of a vehicle according to the present invention yields the following advantages.

A blindness of an ultrasonic sensor may also be assessed at higher driving speeds. This shortens the safety-critical error detection time of the blindness function. An input signal having greater dynamics is available for the blindness detection, as a result of which the robustness of the function may be improved.

An identification of a road condition, in particular, an identification of wetness also becomes possible at no speeds, in particular, already above 0 km/h. The identification of the road condition, in particular, the identification of wetness becomes more robust at higher speeds, since two approximately orthogonal types of signals (noise value and clutter value) are incorporated in the assessment. The road condition identification is also not limited to the identification of wetness. Minimally reflecting surfaces such as, for example, an icy roadway, may also be identified with the aid of the ground echo signal.

According to one further aspect of the present invention, an example method is specified for determining a functional efficiency of an ultrasonic sensor of a vehicle, at least one ground echo signal being determined according to a method as previously described and the functional efficiency of the ultrasonic sensor being determined by evaluating the ground echo signal.

In this example method, the ultrasonic sensor is controlled in such a way that the emitted ultrasonic signal is reflected by the roadway surface in the area around the vehicle. In this way, a large degree of independence of the functional check from the instantaneous location of the motor vehicle is achieved.

By comparing the detected ground echo signal and/or the clutter value derived therefrom with a reference signal and/or with a reference value, it is possible to establish whether the ultrasonic sensor is functionally efficient, or whether the functional efficiency is limited or the ultrasonic sensor is completely blind.

According to one specific embodiment of the present invention, the evaluation of the ground echo signal and thus, the classification of the functional efficiency may take place in an evaluation logic of the receiving ultrasonic sensor itself or in a higher-level control unit.

The information about the functional efficiency of the ultrasonic sensor may be further processed so that the function of the driving assistance system, the part of which is the ultrasonic sensor, for example, may be adapted. The driver may preferably also be informed in the event the functional efficiency of the ultrasonic sensor is limited or is not even present.

According to a further aspect of the present invention, an example method is provided for identifying a road condition in the surroundings of a vehicle, at least one ground echo signal being determined according to a method as previously described, the road condition being identified by evaluating the ground echo signal.

A road condition may be identified, in particular, by comparing the ground echo signal and/or a variable derived from the ground echo signal, in particular, a clutter value, with a reference value and/or with a noise signal.

According to a further aspect of the present invention, a vehicle is provided that includes at least one ultrasonic sensor, a control unit for activating the ultrasonic sensor and a processing unit, which is designed to evaluate signals of the ultrasonic sensor, characterized in that the processing unit is designed to carry out a method according to the present invention for detecting a ground echo signal and/or a method for determining a functional efficiency of the ultrasonic sensor and/or a method for identifying a road condition in the surroundings of the vehicle.

At least one ultrasonic sensor may, in particular, be situated in a bumper at the rear end and/or front end of the vehicle in such a way that a particular fraction of the directional characteristic of the ultrasonic sensor is oriented in the direction of the plane of the roadway. This results in at least a particular amount of sound energy reaching the ground and generating a reliable ground echo signal. At least one ultrasonic sensor may, in particular, be situated in such a way that the sound energy that reaches the ground is magnified as compared to a conventional orientation of an ultrasonic sensor. With this orientation, it is possible to further improve the quality of the ground echo signal.

In one preferred embodiment of the present invention, this is achieved in that the at least one ultrasonic sensor fastened in the bumper in a tilted manner in such a way that a main axis of the directional characteristic of the ultrasonic sensor is inclined toward the roadway surface or toward a plane of the roadway.

Alternatively or in addition, at least one ultrasonic sensor may be fastened at the bumper in such a way that its directional characteristic is rotated 90° relative to at least one additional ultrasonic sensor situated in the bumper and/or to a conventional ultrasonic sensor.

DETAILED DESCRIPTION OF EXAMPLE EMBODIMENTS

Figure 1:
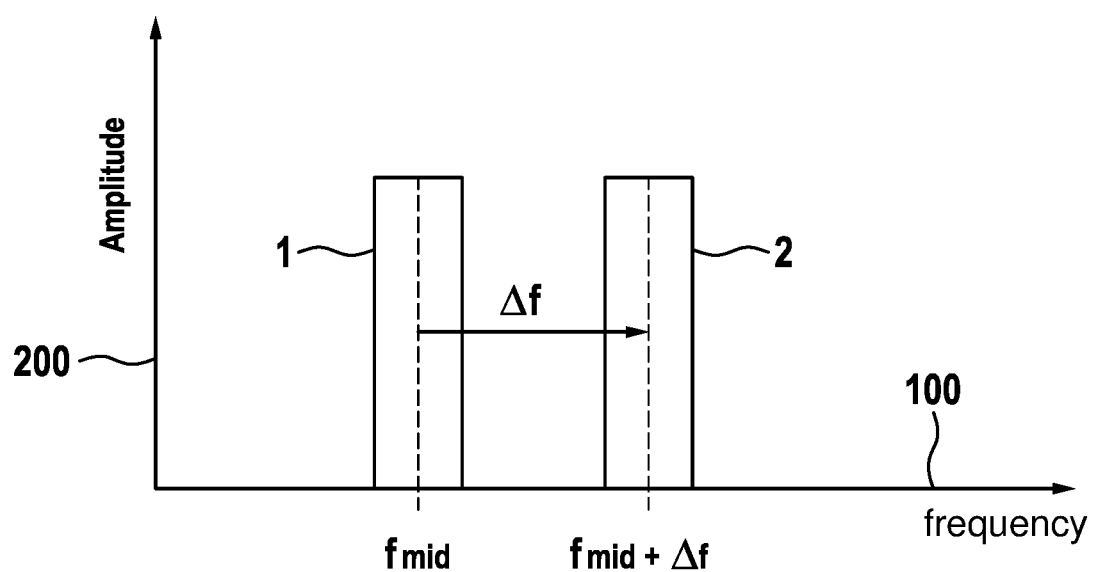
FIG. 1 schematically shows a frequency band of an emitted ultrasonic signal and the Doppler-shifted frequency band of the associated received ultrasonic signal for an ultrasonic sensor situated at the front of the vehicle during forward travel.

In the following description of the exemplary embodiments of the present invention, identical elements are identified with identical reference numerals, if necessary, a repeated description of these elements being dispensed with. The figures represent only schematically the subject matter of the present invention.

FIG. 1 schematically shows an exemplary frequency band 1 of an emitted ultrasonic signal and Doppler-shifted frequency band 2 of the associated received ultrasonic signal for an ultrasonic sensor situated at the front end of the vehicle during forward travel. The frequency is plotted on x-axis 100. The signal amplitude is plotted on y-axis 200. Frequency band 1 of the emitted ultrasonic signal includes a center frequency $f_{mid}$. The forward movement of the transmitting ultrasonic sensor results in a Doppler shift $\Delta f > 0$ to higher frequencies for the received ultrasonic signal for frequency band 2 of the associated received ultrasonic signal, so that the received ultrasonic signal exhibits a center frequency of $f_{mid} + \Delta f$.

Figure 2A:
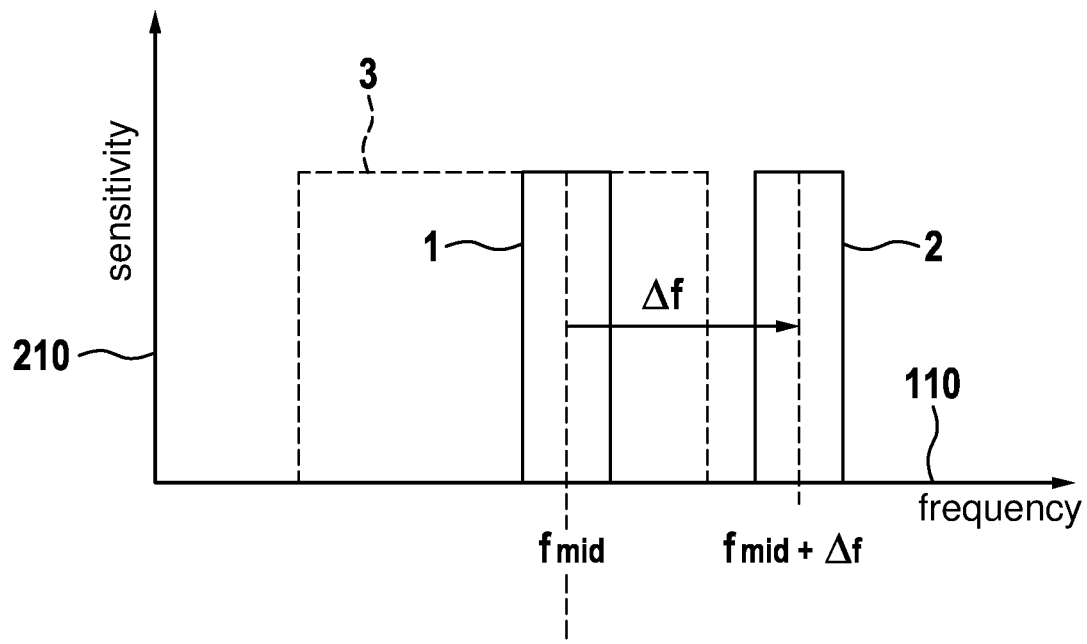
FIG. 2 shows the frequency bands of an emitted ultrasonic signal and of the associated received ultrasonic signal in relation to the sensitivity range of the ultrasonic converter.
Figure 2B:
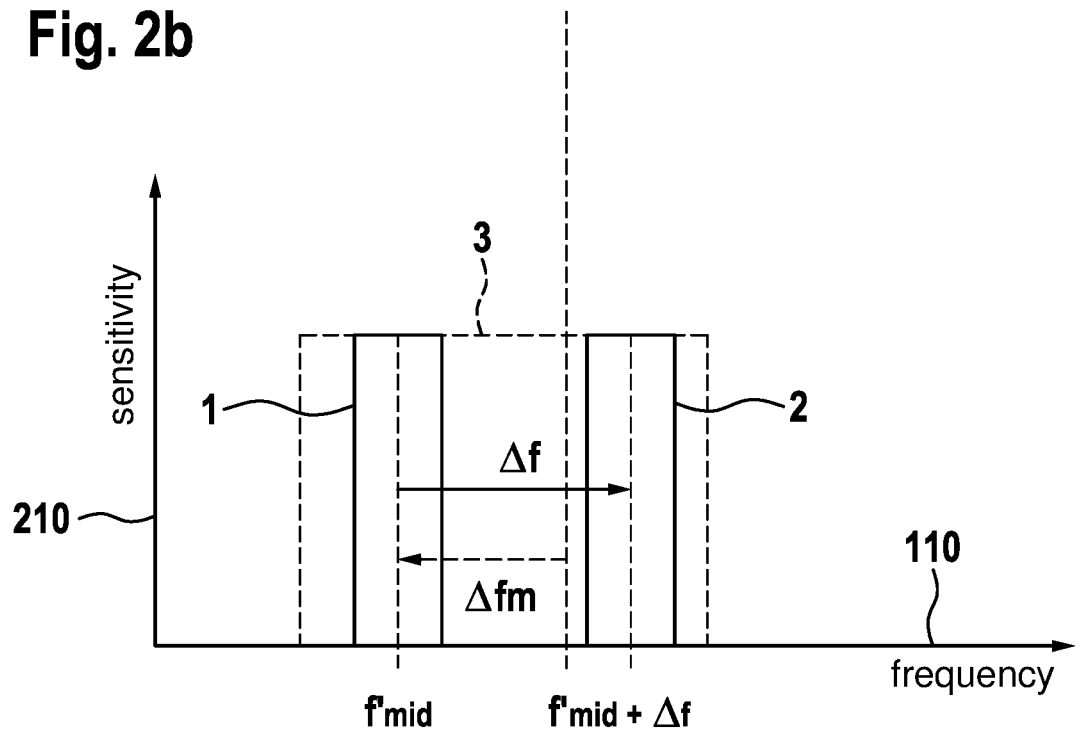

FIG. 2 shows frequency band 1 of emitted ultrasonic signal 1 and frequency band 2 of the received ultrasonic signals from FIG. 1 Doppler-shifted by $\Delta f$. The frequency is again plotted on x-axis 110. In this representation, the sensitivity of the ultrasonic converter is schematically plotted on y-axis 210. The ultrasonic converter in this case refers to the part of the ultrasonic sensor, which converts electrical signals into acoustic signals during the sending of a signal and, during reception of a signal, converts acoustic signals, in this case the sound waves of the sent signal reflected by the ground, into electrical signals according to the conventional principle of an electro-acoustic converter. The diagram in FIG. 2a shows a received signal 2, which is outside the sensitivity range 3 of the ultrasonic converter due to Doppler shift $\Delta f$. The diagram in FIG. 2b shows a send signal 1, the center frequency $f_{mid}$ of which is lowered according to the present invention by an absolute value $\Delta f_{mid}$ relative to $f_{mid}$. The effect of this is that both send signal 1 as well as received signal 2 are in sensitivity range 3 of the ultrasonic converter. It becomes further clear from FIG. 2 that the adaptation of center frequency $f_{mid}$ by $\Delta f_{mid}$ need not necessarily correspond to Doppler shift $\Delta f$. It is sufficient if both frequency bands 1 and 2 are adapted to fall within sensitivity range 3 of the ultrasonic converter.

Figure 3:
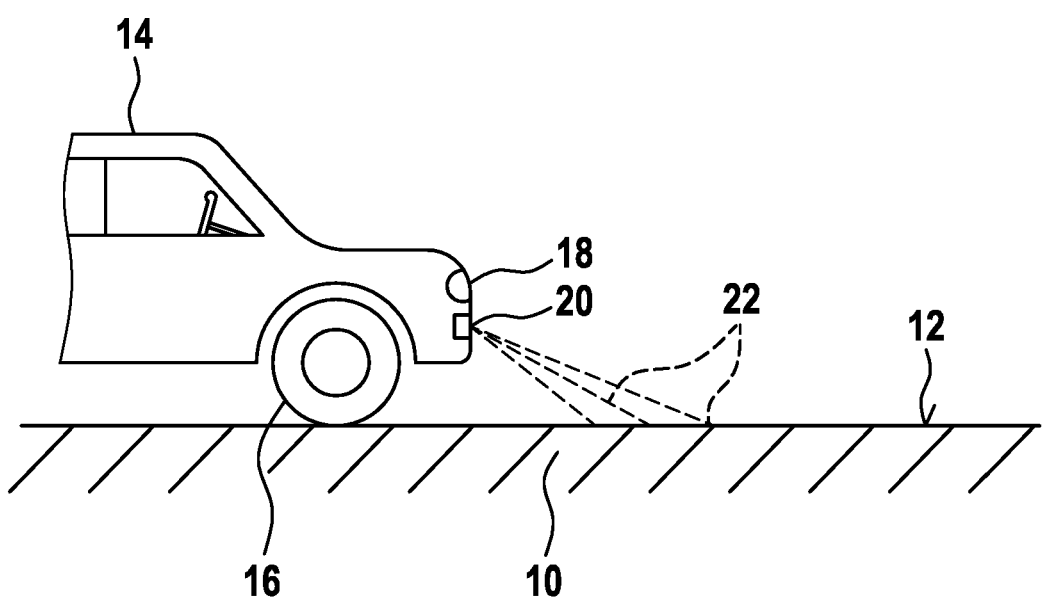
FIG. 3 schematically shows a vehicle scanning the road pavement.

FIG. 3 shows that a vehicle 14 passes over a roadway 10, which is provided with a road pavement 12. A road pavement is understood in the present context to mean the surface on which vehicle 14 moves along during its travel. This may be concrete or asphalt, sand, pebble, unpaved dirt roads, gravel and the like. At least one ultrasonic sensor 20 is located in the front area of vehicle 14 just in front of front wheel 16 below a headlight 18. The at least one ultrasonic sensor 20 is, for example, part of an ultrasonic sensor system, which is already installed at vehicle 14, for example, in conjunction with an assistance system, in particular, a parking assist system. Alternatively, ultrasonic sensor 20 is provided specifically for identifying a road condition, in particular, the condition of road pavement 12, in the surroundings of the vehicle. The at least one ultrasonic sensor 20 according to FIG. 3 continually scans road pavement 12 of roadway 10 during the drive of vehicle 14. Directional characteristic 22, i.e., the spatial area into which the ultrasonic sensor emits its main sound energy and from which the ultrasonic sensor is also able to receive echo signals with high sensitivity, is indicated by line 22. Although the figure depicts ultrasonic sensor 20 located in the front area of vehicle 14, it is alternatively or additionally possible to situate at least one ultrasonic sensor 20 also in the lower area of the side mirrors or in the rear end area of vehicle 14. As a result of its installed position or its geometric dimensions, ultrasonic sensor 20 may be designed in such a way that a large amount of the sound energy radiated by ultrasonic sensor 20 is directed at roadway 10, as a result of which the ground echo signal may be detected with particularly good dynamics.

In order to increase the dynamics of the ground echo signal or of the clutter value, it is expedient to direct as much sound energy as possible toward the ground. This may be achieved by installing at least one ultrasonic sensor 20 in such a way that its directional characteristic (sound beam) is inclined preferably toward the roadway. The vertical tilt angle of the ultrasonic sensor to be installed is conventionally designed as a compromise with respect to the detection capacity of ceiling objects, ground objects and high-standing objects and is not intended to determine ground echo signals.

In one possible embodiment of the present invention, at least one ultrasonic sensor 20 may be installed primarily for the task of detecting ground echo signals. This ultrasonic sensor is only secondarily responsible for detecting objects. Tilt angles are then preferably provided in the range of −5° to −40° relative to the horizontal plane. A sensor pair may also be tilted relative to roadway 10 and installed oriented with respect to one another in such a way that a large portion of the sound energy of the one ultrasonic sensor 20 is reflected by the roadway surface and arrives at the other ultrasonic sensor. In this way, the roadway condition may be deduced based on the intensity of the cross echo thus detected.

Furthermore, ultrasonic sensors may additionally or alternatively be mounted particularly close to the roadway surface. Through this alone, a larger portion of the sound energy also reaches the ground. With a mounting close to the roadway surface, it is also possible with the aid of the noise level to better determine the roadway condition, since the distance to the source of the noise (for example, the so-called wet hissing that occurs between the tires and the roadway) becomes shorter.

The clutter value may be particularly easily determined with the interior sensors directed to the rear, since these sensors are particularly well protected from the noise of the airstream. Hence, the sensors specialized for determining the clutter value are preferably mounted at the rear end of vehicle 14.

Another preferred alternative is to send the sound energy preferably defocused, i.e., having a directional characteristic including a large vertical opening angle. This may be achieved with a fixed diaphragm diameter of the ultrasonic sensor in that the send signals are emitted at a lower center frequency. In this variant, it is particularly advantageous to change the center frequency of the converter with the vehicle speed according to Doppler shift $\Delta f$. The advantage of this variant is that no changes to the design of the sensor are required.

Alternatively, the diaphragm design may be changed in order to generate larger opening angles. This may be achieved, for example, by a smaller diaphragm inner diameter or by a lower resonance frequency. The advantage of this variant is that the opening angle may be optimized specifically for this application.

Alternatively, an ultrasonic sensor from the related art, which has a vertical opening angle of 30° and a horizontal opening angle of 60°, may be installed rotated by 90° so that a vertical opening angle of 60° and a horizontal opening angle of 30° results. This is particularly simple and advantageous since no redesigning of an ultrasonic sensor becomes necessary. In order at the same time to support a parking assistance application, it is further advantageous if the ultrasonic sensors installed rotated in such a way are installed at positions at vehicle 14, at which small horizontal opening angles may be tolerated, for example, in the case of limited sensor distances. Alternatively, the ultrasonic sensors may be installed in addition to the parking assistance sensors.

Classified roadway data are ascertained in a control unit present in vehicle 14 as a function of the reflected ultrasonic signal, i.e., the ground echo signal. The classified roadway data are data that represent the road pavement of roadway surface 12, which vehicle 14 has just passed over. The classification takes place as a function of the detected ground echo signal of the at least one ultrasonic sensor 20.

The identification of the road condition is thus based on the change of the ultrasonic back scatter cross section of the subsurface or of roadway surface 12 under different surface conditions of roadway 10, for example, wetness, black ice or gravel. This is based on the observation that, for example, the backscatter amplitudes in the case of rain-wet and icy roadway surfaces decrease compared to a dry roadway surface.

The consideration given according to the present invention to the Doppler effect when detecting the ground echo signal yields the advantage that the information about the road condition is also available already at low speed and when the vehicle is stopped and is also not limited to wetness. In this case, the ground echo amplitudes may be preferably evaluated in a defined propagation time interval. For this purpose, methods from the related art, for example, an average value, an integral or a threshold value scaled proportionally to the average value may be used. The propagation time interval in this case may be adapted to the instantaneous situation (for example, wetness or black ice), for example, via an adaptation of the starting points and end points of the evaluation window during operation.

What is claimed is:

1. A method for detecting a ground echo signal of an ultrasonic sensor of a vehicle, the method comprising the following steps:
   emitting, by the ultrasonic sensor, a signal at a first frequency or having a first frequency profile, the signal being reflected by a roadway surface;
   receiving, by the ultrasonic sensor or by an additional ultrasonic sensor, the reflected signal;
   filtering, using a matched filter, the received reflected signal, the matched filter having a characterizing frequency;
   determining a ground echo signal from the filtered signal;
   determining an instantaneous vehicle speed;
   determining an expected Doppler shift of the reflected signal as a function of the determined instantaneous vehicle speed; and
   adapting: (i) the first frequency or the first frequency profile, and/or (ii) the characterizing frequency of the matched filter, as a function of the expected Doppler shift,
   wherein the ultrasonic sensor is configured to continually scan the roadway surface during a drive of the vehicle to identify road conditions of the roadway surface.

2. The method as recited in claim 1, wherein a clutter value is determined from the ground echo signal.

3. The method as recited in claim 1, wherein a center frequency of the first frequency profile and/or the characterizing frequency of the matched filter, is shifted by a particular value.

4. A method for determining a functional efficiency of an ultrasonic sensor of a vehicle, comprising the following steps:
   emitting, by the ultrasonic sensor, a signal at a first frequency or having a first frequency profile, the signal being reflected by a roadway surface;
   receiving, by the ultrasonic sensor or by an additional ultrasonic sensor, the reflected signal;
   filtering, using a matched filter, the received reflected signal, the matched filter having a characterizing frequency;
   determining a ground echo signal from the filtered signal;
   determining an instantaneous vehicle speed;
   determining an expected Doppler shift of the reflected signal as a function of the determined instantaneous vehicle speed; and
   adapting: (i) the first frequency or the first frequency profile, and/or (ii) the characterizing frequency of the matched filter, as a function of the expected Doppler shift; and
   determining a functional efficiency of the ultrasonic sensor by evaluating the determined ground echo signal,
   wherein the ultrasonic sensor is configured to continually scan the roadway surface during a drive of the vehicle to identify road conditions of the roadway surface.

5. A method for identifying a road condition in the surroundings of a vehicle, the method comprising the following steps:
   emitting, by the ultrasonic sensor, a signal at a first frequency or having a first frequency profile, the signal being reflected by a roadway surface;
   receiving, by the ultrasonic sensor or by an additional ultrasonic sensor, the reflected signal;
   filtering, using a matched filter, the received reflected signal, the matched filter having a characterizing frequency;
   determining a ground echo signal from the filtered signal;
   determining an instantaneous vehicle speed;
   determining an expected Doppler shift of the reflected signal as a function of the determined instantaneous vehicle speed;
   adapting: (i) the first frequency or the first frequency profile, and/or (ii) the characterizing frequency of the matched filter, as a function of the expected Doppler shift; and
   identifying the road condition by evaluating the ground echo signal,
   wherein the ultrasonic sensor is configured to continually scan the roadway surface during a drive of the vehicle to identify road conditions of the roadway surface.

6. The method as recited in claim 5, wherein the road condition is identified by comparing the ground echo signal and/or a variable derived from the ground echo signal, with a reference value and/or a noise signal.

7. The method as recited in claim 5, wherein the road condition is identified by comparing the ground echo signal and/or a clutter value, with a reference value and/or a noise signal.

8. A vehicle, comprising:
   at least one ultrasonic sensor;
   a control unit configured to activate the at least one ultrasonic sensor;
   processing unit configured to evaluate signals of the at least one ultrasonic sensor, wherein the processing unit is configured to:
   emit, using the at least one ultrasonic sensor, a signal at a first frequency or having a first frequency profile, the signal being reflected by a roadway surface;
   receive, via the at least one ultrasonic sensor or via an additional ultrasonic sensor, the reflected signal;
   filter, using a matched filter, the received reflected signal, the matched filter having a characterizing frequency;
   determine a ground echo signal from the filtered signal;
   determine an instantaneous vehicle speed;
   determine an expected Doppler shift of the reflected signal as a function of the determined instantaneous vehicle speed; and
   adapt: (i) the first frequency or the first frequency profile, and/or (ii) the characterizing frequency of the matched filter, as a function of the expected Doppler shift,
   wherein the at least one ultrasonic sensor is configured to continually scan the roadway surface during a drive of the vehicle to identify road conditions of the roadway surface.

9. The vehicle as recited in claim 8, wherein the at least one ultrasonic sensor is situated in a bumper at a rear end and/or at a front end of the vehicle in such a way that a particular fraction of a directional characteristic of the at least one ultrasonic sensor is oriented in a direction of a roadway surface.

10. The vehicle as recited in claim 9, wherein the at least one ultrasonic sensor is fastened in a bumper of the vehicle in a tilted manner in such a way that a main axis of a directional characteristic of the at least one ultrasonic sensor is inclined toward a roadway surface.

11. The vehicle as recited in claim 9, wherein the at least one ultrasonic sensor is fastened at a bumper of the vehicle in such a way that its directional characteristic is rotated by 90° relative to at least one additional ultrasonic sensor situated in the bumper.

* * * * *